United States Patent
Tang et al.

(10) Patent No.: US 12,299,928 B2
(45) Date of Patent: May 13, 2025

(54) METHOD, DEVICE AND STORAGE MEDIUM FOR ROAD SLOPE PREDICATING

(71) Applicant: Black Sesame Technologies Inc., San Jose, CA (US)

(72) Inventors: Zhiyong Tang, Shanghai (CN); Jiang Peng, Shanghai (CN); Tao Zhang, Shanghai (CN)

(73) Assignee: Black Sesame Technologies Inc., San Jose, CA (US)

( * ) Notice: Subject to any disclaimer, the term of this patent is extended or adjusted under 35 U.S.C. 154(b) by 614 days.

(21) Appl. No.: 17/543,978

(22) Filed: Dec. 7, 2021

(65) Prior Publication Data
US 2022/0254062 A1 Aug. 11, 2022

(30) Foreign Application Priority Data
Feb. 7, 2021 (CN) .......................... 202110168440.8

(51) Int. Cl.
*G06T 7/70* (2017.01)
*G06T 7/11* (2017.01)
(Continued)

(52) U.S. Cl.
CPC ................. *G06T 7/75* (2017.01); *G06T 7/11* (2017.01); *G06T 7/536* (2017.01); *G06T 2207/30244* (2013.01); *G06T 2207/30256* (2013.01)

(58) Field of Classification Search
CPC . G06T 7/11; G06T 7/50–596; G06T 7/60–77; G06T 2207/30244–30268; G06V 20/56–588
See application file for complete search history.

(56) References Cited

U.S. PATENT DOCUMENTS 5,638,116 A * 6/1997 Shimoura ............ G06V 20/588
348/169
2008/0027627 A1 * 1/2008 Ikeda ........................ G06T 7/60
382/104
(Continued)

FOREIGN PATENT DOCUMENTS

CN 109900254 6/2019
CN 110044333 7/2019
(Continued)

OTHER PUBLICATIONS

Partial Translation of Cai Bixin "Research on slope obstacle ranging Method Based on Monocular Vision" (Year: 2019).*
(Continued)

*Primary Examiner* — Sean T Motsinger
(74) *Attorney, Agent, or Firm* — Timothy Wang; Ni, Wang & Massand, PLLC

(57) ABSTRACT

A road slope predicting method, a device, and a storage medium are disclosed. The road slope predicting method includes obtaining a road image of a road by a camera, detecting a first image lane line and a second image lane line of the road from the road image, setting a number of road image segmentation points along a road image center line of the first image lane line and the second image lane line respectively by means of the corresponding road image segmentation points, determining the pitch angle of the camera with respect to the road plane at each road space segmentation point; based on the internal and external parameters of the camera and the pitch angle, a space coordinate of each road space segmentation points is calculated in a recursive man. A road model of the road is constructed based on each space coordinate.

9 Claims, 5 Drawing Sheets

(51) Int. Cl.
    *G06T 7/536* (2017.01)
    *G06T 7/73* (2017.01)

(56) References Cited

U.S. PATENT DOCUMENTS

2017/0177952 A1* 6/2017 Nakamura ................ G06T 7/13
2022/0254062 A1* 8/2022 Tang .......................... G06T 7/11

FOREIGN PATENT DOCUMENTS

| CN | 111476106 | 7/2020 |
| CN | 112184792 | 1/2021 |
| CN | 112304293 | 2/2021 |
| JP | H08136237 | 5/1996 |
| WO | 2020146980 | 7/2020 |

OTHER PUBLICATIONS

Shiqin Chen ; Visual Perception and Recognition of Vehicular Access under Complex Conditions; A Dissertation Submitted for the Degree of Master; Chang'an University, Xi'an, China; Apr. 2017.

Bixin Cai; Research on Slope Obstacle Ranging Method Based on Monocular Vision; A Dissertation Submitted for the Degree of Master; Hefei University of Technology Hefei, Anhui, P.R.China; Apr. 2019.

Wenting Luo, Lin Li; The 3D Roadway Alignment Measurement for High Definition Map; Bulletin of Surveying and Mapping; 2018( 12) : 46-51. DOI: 10. 13474 /j. cnki. 11-2246. 2018. 0382; China.

Eser Ustunel, Engin Masazade; Vision-based road slope estimation methods using road lines or local features from instant images; IET Intell. Transp. Syst., 2019, vol. 13 Iss. 10, pp. 1590-1602.

\* cited by examiner

METHOD, DEVICE AND STORAGE MEDIUM FOR ROAD SLOPE PREDICATING

CROSS-REFERENCE TO RELATED APPLICATIONS

The disclosure claims priority to Chinese patent disclosure No. 202110168440.8, filed on Feb. 7, 2021, the entire contents of which are incorporated herein by reference.

TECHNICAL FIELD

The present disclosure relates to the field of vehicle working environment detection, and more specifically, to a method, a device and a storage medium for a road slope predicting.

BACKGROUND

With the development of automatic driving technology, more and more vehicles are equipped with various driving assistance technologies, which makes the vehicles become more and more intelligent. However, the working environment of the vehicle is very complicated, especially the road environment where the vehicle is travelling is very complicated and changeable, which may be a straight road, a curve road or up and down ramp. Different road conditions (especially ramps) can affect vehicle dynamics models and, in turn, the vehicle control strategies, so it is necessary to predict the road slopes. Moreover, the prediction of road slope also contributes to the improvement of visual ranging accuracy. There are many techniques for obtaining a road slope, but these road slope obtaining techniques can either only calculate the slope of the road over which the vehicle has traveled and cannot predict the ramp of the road ahead of the vehicle, or the implementation cost is relatively high, or the implementation is relatively complex, and the accuracy is relatively low, so the current use requirements cannot be well satisfied.

Therefore, there is a need for a road ramp predicting technology so that an ordinary camera or a video camera can be used as an image obtaining element and predicting of a road ramp can be realized in a relatively simple manner. In addition, the realization cost is low, and the precision is high.

SUMMARY

In view of the above, the present disclosure provides a method, an apparatus, and a storage medium for road slope predicting such that an ordinary camera or a video camera can be used as an image obtaining element, and the prediction of the road ramp can be realized in a relatively simple way, and the realization cost is low, and the precision is high.

In one aspect of the disclosure, a method for road slope predicting is provided. The step includes obtaining a road image of a road by a camera, detecting a first image lane line and a second image lane line of the road from the obtained road image, setting a number of road image segmentation points along a road image center line of the first image lane line and the second image lane line, determining a pitch angle of the camera with respect to the road plane at each road space segmentation point by the road image segmentation points, respectively, calculating spatial coordinates of each road space segmentation points in a recursive manner based on internal parameters, external parameters and pitch angle of the camera, and constructing a road model of the road based on each of the spatial coordinates.

In one implementation, the method further includes obtaining a slope angle of the road at an arbitrary position or a corresponding road depth using the road model.

In one implementation, the step of determining a pitch angle of the camera with respect to the road plane at each road space segmentation point by the road image segmentation points, respectively further includes:
fitting portions of the first image lane line and the second image lane line within a neighborhood interval of the road image segmentation points into a first straight line and a second straight line, respectively;
determining an intersection of the first straight line and the second straight line as an image vanishing point of the road; and
calculating a pitch angle of the camera with respect to the road plane at the road space division point based on the image coordinates of the image vanishing point.

In one implementation, the step of fitting portions of the first image lane line and the second image lane line within a neighborhood interval of the road image segmentation points into a first straight line and a second straight line, respectively includes: fitting portions of the first image lane line and the second image lane line within the neighborhood interval of the road image segmentation points into a first straight line and a second straight line, respectively by using a least square method or a random sampling consensus algorithm.

In one implementation, the step of calculating a pitch angle of the camera with respect to the road plane at the road space division point based on the image coordinates of the image vanishing point comprises calculating the pitch angle using the following formula:

$$\tan\theta = \frac{v - c_y}{f_y};$$

wherein, $\theta$ is the pitch angle to be calculated, $(u, v)$ is the image coordinate of the current image vanishing point, $f_x$, $f_y$, $c_x$, $c_y$ are the camera internal parameters.

In one implementation, the step of constructing a road model of the road based on each of the spatial coordinates includes an equation for representing a road spatial center line of the road is fitted using a curve fitting method as the road model based on each of spatial coordinates.

In one implementation, the curve fitting method comprises polynomial curve fitting or spline curve fitting.

In one implementation, the step of calculating spatial coordinates of each road space segmentation points in a recursive manner based on internal parameters, external parameters and pitch angle of the camera includes solving spatial coordinates of each road spatial segmentation points based on the following equations:

$$\begin{bmatrix} u \\ v \\ 1 \end{bmatrix} = \frac{1}{z_c} \cdot \begin{bmatrix} f_x & 0 & c_x & 0 \\ 0 & f_y & c_y & 0 \\ 0 & 0 & 1 & 0 \end{bmatrix} \cdot \begin{bmatrix} R & T \\ 0 & 1 \end{bmatrix} \cdot \begin{bmatrix} x_w \\ y_w \\ z_w \\ 1 \end{bmatrix} \text{ and}$$

$$\left\langle \overrightarrow{P_n P_{n-1}}, \overrightarrow{K_n} \right\rangle = \frac{\theta_n - \theta_{n-1}}{2}.$$

Wherein n is an integer equal to or greater than 1, $(x_w, y_w, z_w)$ is the space coordinate of the road space segmentation point Pn to be calculated, $(u, v)$ is an image coordinate of a road image segmentation point corresponding to the road space segmentation point Pn, $f_x$, $f_y$, $c_x$, $c_y$ are internal parameters of the camera, R is an external parameter rotation matrix of the camera, T is an external parameter translation vector of the camera, $\theta_n$ is a pitch angle of the camera with respect to the road plane at the road space segmentation point Pn, $\theta_{n-1}$ is a pitch angle of the camera with respect to the road plane at the previous road space segmentation point Pn−1; the space coordinate of the first road space segmentation point P0 is pre-determined according to an origin of the three-dimensional space coordinate system.

In a second aspect of the present disclosure, a road slope predicting device including a memory in which a machine executable program is stored, and a processor is provided. The processor, when executing the machine executable program, implements the road gradient prediction method according to the first aspect of the present disclosure.

In a third aspect of the present disclosure, a computer readable storage medium having stored therein a computer program is provided. The computer program, when executed by a processor, implements the road slope predicting method according to the first aspect of the present disclosure.

DETAILED DESCRIPTION OF THE EMBODIMENTS

In order to make the above objects, features and advantages of the present disclosure easier to understood, specific embodiments of the present disclosure will be described in detail with reference to the accompanying drawings. Although numerous specific details are set forth in the following description, the disclosure can be embodied in many other ways than those described herein. Those skilled in the art can make similar modifications without departing from the spirit of the invention. Therefore, the present disclosure is not limited by the specific embodiments disclosed below.

In the description of the present disclosure, the terms "first" and "second" are only used to distinguish between different technical features and are not to be construed as indicating or implying the relative importance or order of the indicated technical features.

In the description of the present disclosure, a road indicates a lane on which the vehicle is currently travelling, and a lane line refers to a boundary line for separating or defining the road or lane. In addition, in the description of the present disclosure, for convenience of description, two lane lines detected in the road image for separating the road or lane on which the vehicle is travelling are respectively referred to as a "first image lane line" and a "second image lane line". The center lines of the "first image lane line" and "second image lane line" are referred to as "road image center lines". In the description of the present disclosure, three-dimensional lane lines corresponding to "first image lane line" and "second image lane line" are also referred to as "first spatial lane line" and "second spatial lane line" respectively. The center line of the first spatial lane line and the second spatial lane line is referred to as the "road space center line". In the description of the present disclosure, each segmentation point set in the road image for dividing the road into a number of sections is also referred to as a "road image segmentation point". Each three-dimensional space segmentation point corresponding to these road image segmentation points is referred to as a road space segmentation point. In addition, in the description of the present disclosure, the "neighborhood section" of any road image segmentation point refers to a small section of road surface surrounding the road image segmentation point. In addition, in the description of the present disclosure, a vanishing point of a road section in the neighborhood of each road image dividing point is referred to as an image vanishing point.

Figure 1:
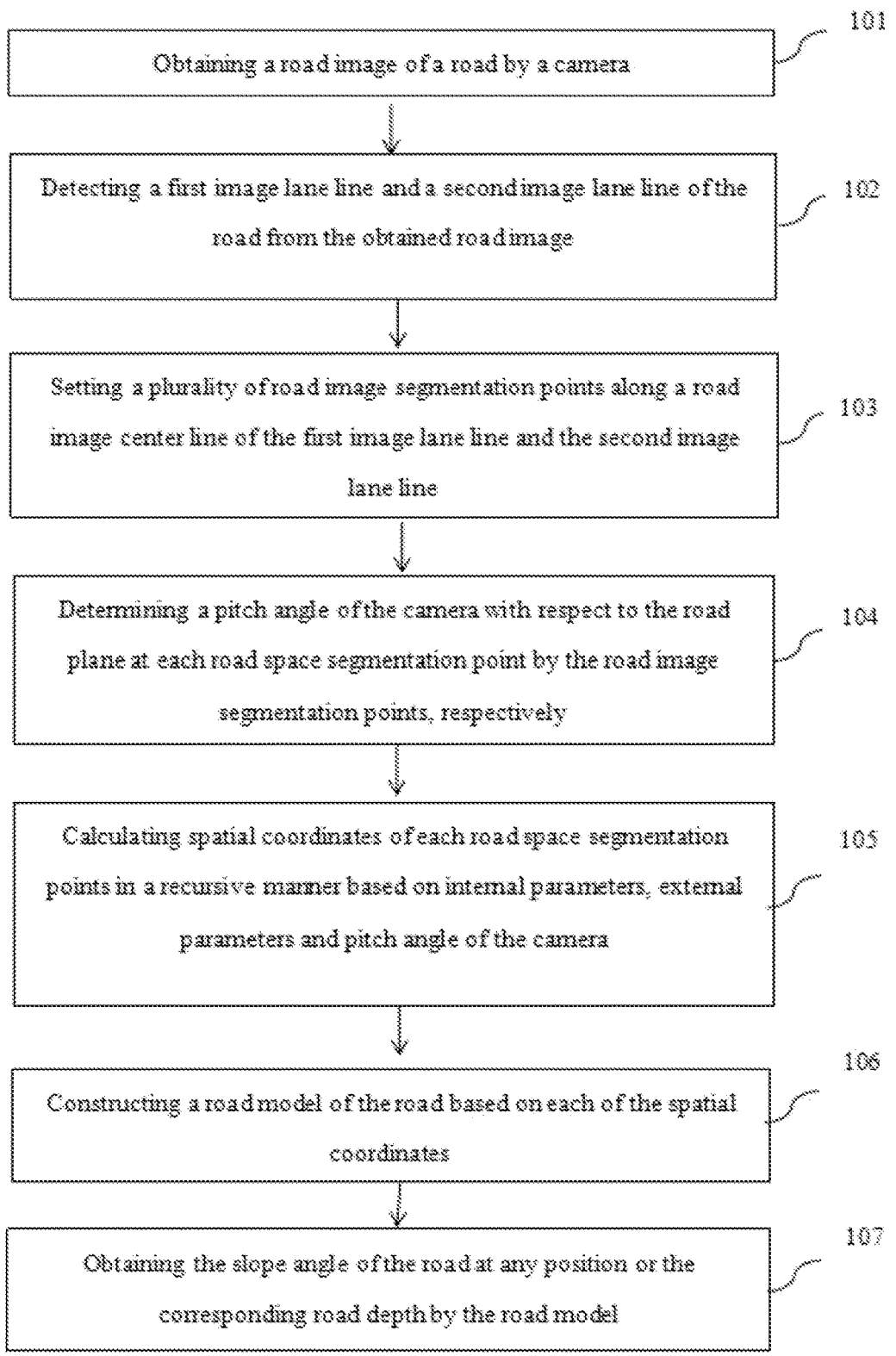
FIG. 1 shows a flowchart of a road slope predicting method according to an embodiment of the present disclosure.

In one embodiment, a method for road slope predicting is provided. As shown in FIG. 1, the road slope predicting method may include the following steps of 101-106, of course, may further include step 107.

Figure 3:
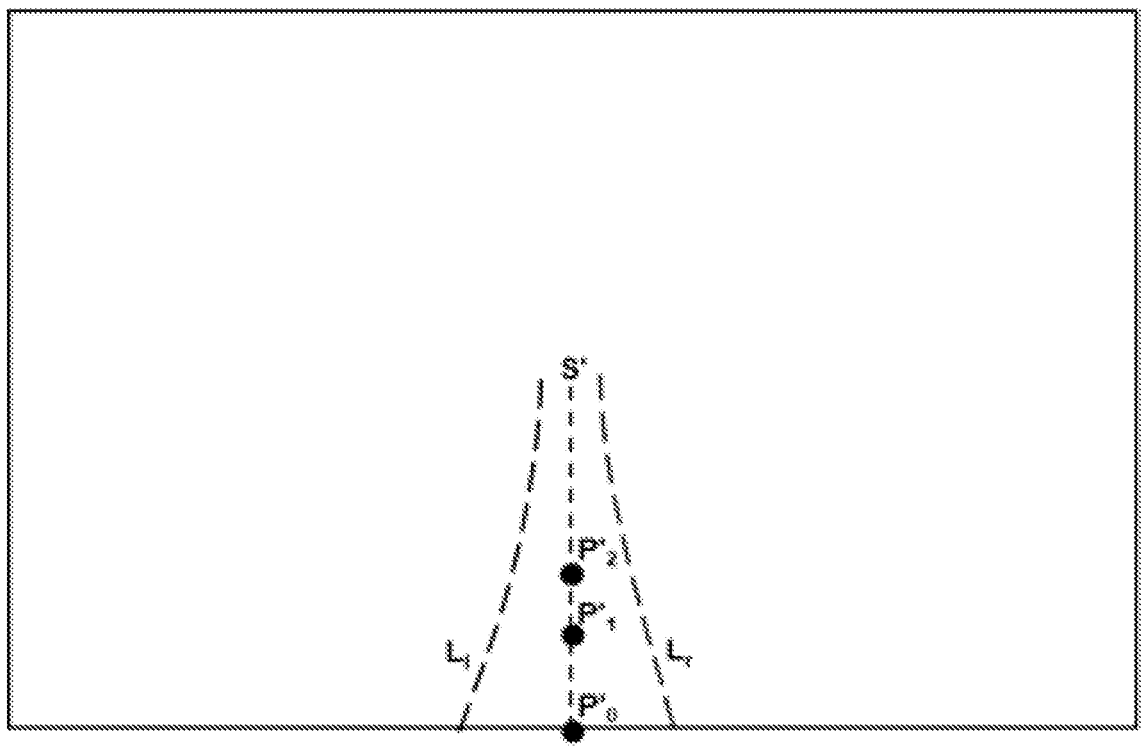
FIG. 3 shows a schematic diagram of an example road image according to an embodiment of the present disclosure.

In step 101, a road image of a road is obtained by a camera. In one implementation, the camera is a camera mounted or fixed on a vehicle, and the camera may be any kind of common camera, such as a common digital camera, a camera configured on a mobile device, and the like. The obtained road image includes at least an image of a lane or road ahead of the vehicle. For example, an example of a road image according to the present disclosure is provided in FIG. 3, in which the obtained road image includes only an image of the road or lane where the vehicle is travelling. However, it should be understood that the road image may also include other image portions (e.g., image portions of other roads or lanes), but these other image portions are not of interest to the solution of the present disclosure.

In step 102, a first image lane line (for example, $L_l$ in FIG. 3) and a second image lane line (for example, Lr in FIG. 3) of a road are detected from the road image obtained in step 101. In one implementation, the first image lane line and the second image lane line may be detected from the road image using a method such as deep learning.

In step 103, a number of road image segmentation points are set along the road image center lines of the first image lane line and the second image lane line. For example, in the example road image shown in FIG. 3, the first image lane line is Ll, the second image lane line is Lr, the road image center line is S', and the road image segmentation points are P0', P1' and P2'. Although only three road image segmentation points are set in FIG. 3, more or fewer road image segmentation points may be set in practical applications.

In the present disclosure, those road image segmentation points may segment a road into a number of segments. In one implementation, more road image segmentation points (i.e., more segments into which that road is segment) may be set at a position of a center line of the road image that represents a more abrupt change in road slope. On the other hand, fewer road image segmentation points (that is, segmenting the road into fewer segments) may be set at a position where the road slope is gentler and uniform, which reduces the calculation amount while ensuring the accuracy at the same time. In another more preferred implementation, however, fewer road image segmentation points may be set at a position closer to the middle line of the road image below the road image (for example, a position closer to P0'), On the other hand, fewer road image segmentation points are set at positions closer to the upper side of the road image. The two segmentation methods described above advantageously take into account the limiting factors such as image resolution, and is therefore more practical. In the road image, since the vehicle is closer to the position below the road image, the physical distance represented by the unit pixel in the road image is smaller, and the road surface changes more smoothly. Fewer segments are therefore required. The closer to the location above the road image, the closer to the horizon, the greater the physical distance represented by a unit pixel, which amounts to a collection of large variations over a very small frame, and thus more segments are required.

In one implementation, since the slope of a road at a distance may be difficult to measure, but can only be approximately predicted, the road slope can be continuously predicted while the vehicle is travelling. Each road slope predicting may be performed only for portions of the road that are within a predetermined distance range of the vehicle.

In step 104, the pitch angle of the camera with respect to the road plane at each road space segmentation points is determined by means of the respective road image segmentation points, respectively. In the present disclosure, each road image segmentation points set on a road image corresponds to one road space segmentation point of a road in a three-dimensional space. For example, in FIG. 4, P0, P1, and P2 represent road space segmentation points corresponding to the road image segmentation points P0', P1', and P2' in FIG. 3, respectively. Specifically, the pitch angle of the camera with respect to the road plane at each road space segmentation point is the included angle between the optical axis of the camera (e.g., the optical axis OA shown in FIG. 4) and the road space central line at the road space plane at the road space segmentation point. Taking FIG. 4 as an example, K0 is the projection of the road plane of the road space center line at the road space segmentation point P0 on the plane shown in FIG. 4. K1 is the projection of the road plane of the road space center line at the road space segmentation point P1, and K2 is the projection of the road space center line on the road plane at the road space segmentation point P2. Therefore, in the example shown in FIG. 4, the pitch angle θ of the camera with respect to the road plane at the road space segmentation point P0 refers to the included angle between the camera optical axes OA and K0. The pitch angle of the camera with respect to the road plane at the road space segmentation point P1 refers to the angle between the camera optical axes OA and K1, and the pitch angle of the camera with respect to the road plane at the road space segmentation point P2 refers to an angle between the camera optical axes OA and K2.

Figure 2:
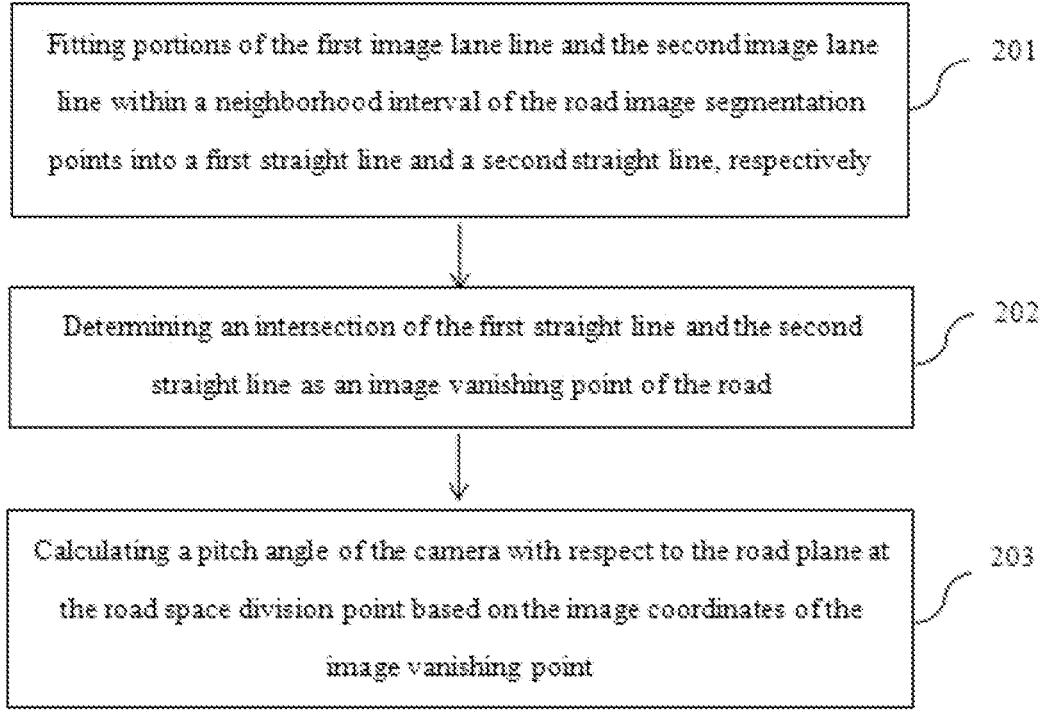
FIG. 2 shows a flowchart of determining a pitch angle according to an embodiment of the present disclosure.

In this disclosure, as shown in FIG. 2, the method of determining the pitch angle in step 104 may include steps 201-203.

In step 201, the portions of the first image lane line and the second image lane line in the neighborhood interval of the road image segmentation point are fitted into a first straight line and a second straight line, respectively. It should be understood that, in this disclosure, the portions of each image lane line within the neighborhood interval of the road image segmentation point are different from the segments mentioned in the description of step 103 above. In one implementation, the method of least square, straight line fitting algorithm such as random sample consensus (RANSAC) may be used to fit the segments of the first image lane line and the second image lane line within the neighborhood interval of the road image segmentation point into a first straight line and a second straight line, respectively. For example only, each image lane line may be used when the least square method is used to fit the straight lines (i.e., the first image lane line or the second image lane line) is subjected to a straight line fitting of the image lane line at a total of five sampling points on both sides of the point divided by the neighborhood interval. This straight line fitting method can reduce the number and interval of sampling points, but only need to ensure that these sampling points fall within the corresponding neighborhood intervals.

In addition, in the present disclosure, the neighborhood section of the road image segmentation point is mainly used to approximate the curved surface of the road near the point as a plane. Therefore, the neighborhood interval should be as small as possible provided that the adopted straight line fitting algorithm can be satisfied.

In step 202, an intersection of the first straight line and the second straight line is determined as an image vanishing point of the road. It will be appreciated that after the first straight line, the second straight line and the image vanishing point of the road are determined, the road plane at the corresponding road space segmentation point (i.e., the plane defined by the first straight line and the second straight line) is determined. It should be appreciated that the line connecting the corresponding road space segmentation point and the vanishing point is a projection of the road plane (for example, in FIG. 4, the projection of the road plane at P0 is K0, and the projection of the road plane at P1 is K1, and the projection of the road plane at P2 is K2).

In step 203, the pitch angle of the camera with respect to the road plane at the corresponding road space segmentation point is calculated based on the image coordinates of the image vanishing point. In the present disclosure, the image coordinates of the image vanishing point refers to the coordinate of the image vanishing point in the image coordinate system. The image coordinate system of the road image may be defined as a coordinate system having an upper left point of the road image as an origin, a direction from the origin to the right as the x-axis direction, and a direction downward from the origin as the y-axis direction.

In the present disclosure, each pitch angle can be calculated using the follow formula (1), $$\tan\theta = \frac{v - c_y}{f_y}, \tag{1}$$

In the formula (1), θ is the pitch angle to be calculated, (u, v) is the image coordinate of the current image vanishing point, $f_x$, $f_y$, $c_x$, $c_y$ are the camera internal parameters.

In this disclosure, the pitch angle of the camera with respect to the road plane at each road space segmentation point may be determined using the method described in connection with FIG. 2, such as in the example shown in FIG. 4. The pitch angle at the road space segmentation point P0, the pitch angle at the road space segmentation point P1, and the pitch angle at the road space segmentation point P2 may be respectively determined using this method.

Returning to FIG. 1, in step 105, the spatial coordinates of each road space segmentation point are calculated in a recursive manner based on the internal and external parameters of the camera and the pitch angle.

In the disclosure, the space coordinate of each road space segmentation point refers to a coordinate of each road space segmentation point in a three-dimensional space coordinate system for describing a road model to be constructed. The three-dimensional coordinate system may be defined as a world coordinate system, for example, by taking a point under the vehicle (e.g., in FIG. 4, a road space segmentation point P0 corresponding to a road image segmentation point P0' at the bottom of the road image center line) as an origin point, and a ground plane under the vehicle (for example, the road plane at the road space segmentation point P0) as a reference plane. The three-dimensional coordinate system may also take the center of the rear axle of the vehicle as the origin, which is generally more customary since the position of the road space segmentation point P0 relative to the vehicle may change while the vehicle is travelling (i.e., the pitch angle $K_0$ of the camera with respect to the camera may change. However, it is not critical that which point is selected as the origin of the world coordinate system, because the different points as the origin will only affect the constant term of the expression of the finally constructed road model. The spatial coordinates of the road space segmentation point P0 in the three-dimensional coordinate system may be predetermined according to the selected origin, for example in the case where the road space segmentation point P0 is selected as the origin of the three-dimensional coordinate system, the spatial coordinate of the road space segmentation point P0 is (0, 0, 0).

Figure 4:
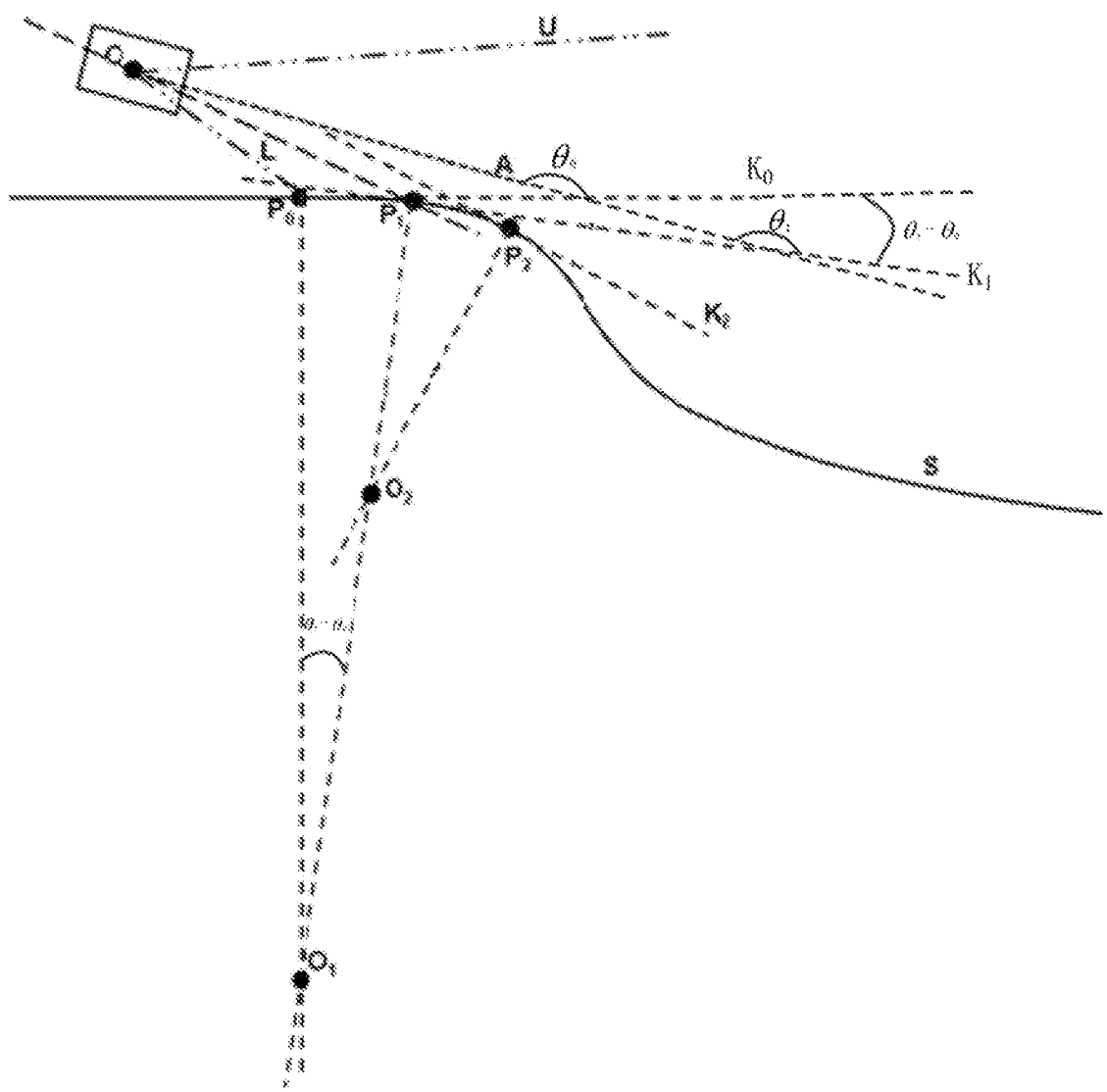
FIG. 4 is a schematic diagram showing a principle of calculating space coordinates of a road space segmentation point of the road shown in FIG. 3.

Calculating the space coordinate of each road space segmentation point in a recursive manner means firstly calculating the first road space segmentation point on the basis of the space coordinate of the road space segmentation point P0 (for example, the space coordinate of the road space segmentation point P1 in FIG. 4), and then the second road space segmentation point (for example, the space coordinate of the road space segmentation point P2 in FIG. 4) is calculated on the basis of the space coordinate of the first road space segmentation point P1. Similarly, the space coordinates of all the road space segmentation points are obtained in this manner.

In one implementation, the spatial coordinate of each road spatial segmentation point may be solved in a recursive manner based on the following equations (2) and (3).

$$\begin{bmatrix} u \\ v \\ 1 \end{bmatrix} = \frac{1}{z_c} \cdot \begin{bmatrix} f_x & 0 & c_x & 0 \\ 0 & f_y & c_y & 0 \\ 0 & 0 & 1 & 0 \end{bmatrix} \cdot \begin{bmatrix} R & T \\ 0 & 1 \end{bmatrix} \cdot \begin{bmatrix} x_w \\ y_w \\ z_w \\ 1 \end{bmatrix} \quad (2)$$

$$\left\langle \overrightarrow{P_n P_{n-1}}, \overrightarrow{K_n} \right\rangle = \frac{\theta_n - \theta_{n-1}}{2} \quad (3)$$

In the above equations (2) and (3), n is an integer equal to or greater than 1, $(x_w, y_w, z_w)$ is the space coordinate of the road space segmentation point Pn to be calculated, (u, v) is an image coordinate of a road image segmentation point corresponding to the road space segmentation point Pn, $f_x$, $f_y$, $c_x$, $c_y$ are internal parameters of the camera, R is an external parameter rotation matrix of the camera, T is an external parameter translation vector of the camera, $\theta_n$ is a pitch angle of the camera with respect to the road plane at the road space segmentation point Pn, $\theta_{n-1}$ is a pitch angle of the camera with respect to the road plane at the previous road space segmentation point Pn−1. The space coordinate of the first road space segmentation point P0 is pre-determined, namely, the origin of the three-dimensional space coordinate system may be determined in advance as described above. In addition, in the above equations, the internal parameters of the camera is generally fixed for a specific camera, the external parameter rotation matrix R of the camera is a 3×3 matrix rotate between the world coordinate system and the camera coordinate system, which is uniquely determined by the camera pitch angle, the yaw angle and the roll angle. In general, after the camera is mounted and fixed, the camera yaw angle and the roll angle will not change again, however, the pitch angle of the camera depends on the position of the obtained road image, which is the pitch angle at the road space segmentation point P0 in the present disclosure. The T is determined for a fixed position camera mounted on the vehicle, and can be obtained through the calibration.

It should be appreciated that in this disclosure, the physical meaning of formula (3) above means that the angle between the vector PnPn−1 and the vector Kn should be equal to $$\frac{\theta_n - \theta_{n-1}}{2}.$$

The direction of Kn is known in the formula (3). The direction may be determined in the step 202 (i.e., the direction in which Pn points to the corresponding vanishing point), while the direction of vector PnPn−1 is unknown, so the direction of vector PnPn−1 may be determined by solving the equation (3). Further, the spatial coordinate of Pn can be determined based on formula (2). For example, FIG. 4 illustrates a projection of a road space center line after compressing a certain dimension (e.g., dimension z) in the three-dimensional space. The example shown in FIG. 4 may help to understand the principle of equation (3). In FIG. 4, S is the projection of the road space center line, K0 is the projection of the road plane of the road at point P0 of the road space center line, K1 is the projection of the road plane of the road at point P1 of the road space center line, K2 is the projection of the road plane of the road at point P2 of the road space center line, straight line P0O1 is the normal of S at point P0, straight line P1O1 is the normal of S at point P1, straight line P2O1 is the normal of S at point P2. The straight line OA is the optical axis of the camera. For example, the angle $\theta_1 - \theta_0$ indicated in FIG. 4 is the difference between the included angle between the camera optical axes OA and K1 (i.e. the pitch angle at P1) and the included angle between the camera optical axes OA and K0 (i.e. the pitch angle at P0). The angles between P0O1, K0 and K1 should be all as $$\frac{\theta_1 - \theta_0}{2},$$

and other road space segmentation points can also be calculated in a similar manner to this method.

In step 106, a road model of the road is constructed based on each of the spatial coordinates calculated in step 105. In one implementation, a curve fitting method may be used to fit an equation representing a road spatial center line of the road as the road model based on each spatial coordinate. The curve fitting method may include polynomial curve fitting (e.g., a quadratic polynomial equation like $y=a0+a1x+a2x^2$ or a cubic polynomial equation like $y=a0+a1x+a2x^2+a3x^3$) or curve fitting splines, etc. The exact type of curve fitting method selected may depend on the degree of curvature of the center line of the road space. For example, in the case that the road space center line is more regular and gentler, the quadratic or cubic polynomial equation is used to fit the road space center line. However, in case where the center line in the road space is relatively complex, for example in the case of a wave shape, it is difficult to express the center line by an ordinary low order polynomial equation. Hence, spline curve can be used to fit the center line of the road space. In this disclosure, because the quadratic curve equations in space are more complex to describe, in one implementation, a variable of a road space center line in a certain dimension (e.g., dimension z) is compressed (i.e., ignoring the coordinates of each calculated spatial coordinate in the dimension), only the projection of the road space center line on a specific plane, such as the projection S of the road space center line in the plane as shown in FIG. 4 is fitted.

In step 107, a slope angle of the road at an arbitrary position or a corresponding road depth of the road is obtained by using the road model. In the disclosure, the depth of the road at a location refers to the depth of the road at the location relative to the reference plane. For example, in FIG. 4, the plane K0 is taken as the reference plane, and the road depth is 0. If a certain position is 10 m below the reference plane, the road depth at that position is 10 m. The slope angle of the road may be obtained by differentiating the road model constructed in step 106 (i.e., the equation used to represent the road space center line of the road) based on the specific location. For example, in the example shown in FIG. 4, the x-axis of the coordinate system is taken to be in the right direction of K0, and the y-axis is taken to be in an upward direction perpendicular to K0. The dimension z thereof is compressed, and the equation used to represent the center line of the road space (i.e., the road model) is a quadratic polynomial $y=a_0+a_1x+a_2x^2$, the road depth at the location $P_p(x_p, y_p)$ is $y_p=a_0+a_1x_p+a_2x_p^2$ and the slope angle is $\alpha=\arctan(a_1+2a_2x_p)$.

In the above method, it is sufficient to obtain a road image of a road by using an ordinary camera or a video camera only as an image obtaining element without using an expensive sensor device such as a binocular camera or a depth camera. Therefore, the implementation cost is relatively low, and the method is relatively simple to be implemented, and the accuracy is relatively high.

Figure 5:
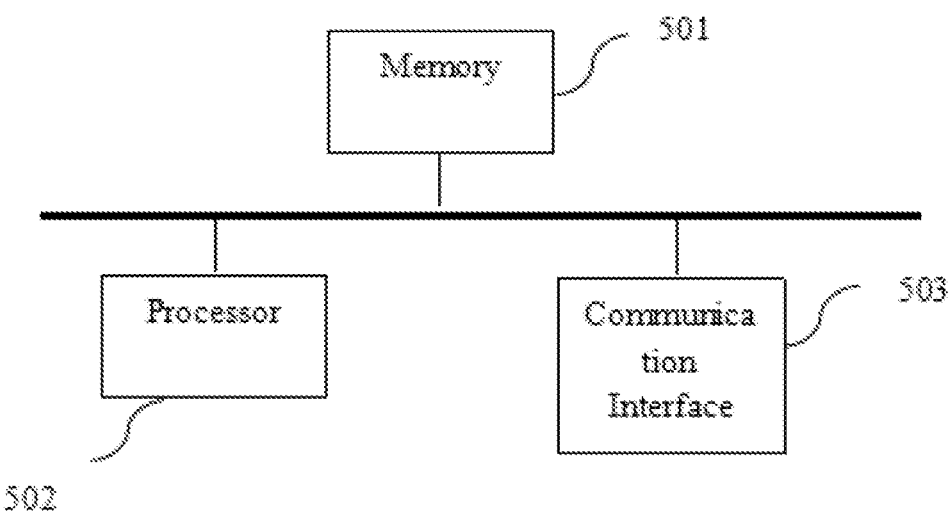
FIG. 5 shows a schematic structural block diagram of a road slope predicting device according to an embodiment of the present disclosure.

According to an embodiment, the present disclosure also provides a device for predicting a road slope, as shown in FIG. 5, the device for predicting road device includes a memory 501 and a processor 502. A machine executable program is stored in the memory 501. The processor 502 is configured to, when executing the machine executable program, implement the road slope predicting method described in the above embodiment. In the present disclosure, the number of memory 501 and processor 502 may be one or more. In the present disclosure, the road slope predicting device may be implemented using an electronic device intended to represent various forms of digital computers, such as, laptop computers, desktop computers, workstations, personal digital assistants, servers, blade servers, mainframe computers, and other suitable computers. The electronic device may also be various forms of mobile devices such as personal digital processing, cellular telephones, smart phones, wearable devices, and other similar computing devices.

The road slope predicting apparatus may also include a communication interface 503 for communicating (wired or wireless) with external devices (e.g. cameras for capturing images of the road) in order to exchange data.

The memory 501 may include non-volatile memory and volatile memory. The non-volatile memory may include, for example, read-only memory (ROM), magnetic tape, floppy disk, flash memory, or optical memory. The volatile memory may include, for example, a random access memory (RAM) or an external cache memory. By way of illustration and not limitation, the RAM may be in various forms, such as static random access memory (SRAM) or dynamic random access memory (DRAM).

The memory 501, the processor 502, and the communication interface 503 may be connected to each other through a bus and communicate with each other. The bus may be an Industry Standard Architecture (ISA) bus, a Peripheral Component (PCI) bus, an Extended Industry Standard Component (EISA) bus, or the like. The bus may be sorted into an address bus, a data bus, a control bus, and the like. For ease of representation, only one bold line is shown in FIG. 5, but it is not shown that there is only one bus or one type of bus.

The above-described embodiments are merely illustrative of several embodiments of the present disclosure and are described in detail, but are not to be construed as limiting the scope of the invention patent. It should be noted that a number of modifications and improvements may be made to those of ordinary skill in the art without departing from the spirit of the present disclosure, all of which are within the scope of protection of the present disclosure. Accordingly, the scope of protection of the present disclosure shall be subject to the appended claims.

What is claimed is:

1. A road slope predicting method, comprising:
obtaining a road image of a road by a camera installed on or in a vehicle that is currently in motion;
detecting a first image lane line and a second image lane line of the road from the obtained road image by a processor in a device installed on or in the vehicle for road slope, and forming three-dimensional lane lines corresponding to the first image lane line and the second image lane line as the first spatial lane line and the second spatial lane line;
using the processor to set a plurality of road image segmentation points along a road image center line of the first image lane line and the second image lane line and the second image lane line, and divide the road into multiple segments by the road image segmentation points;
using the processor to determine a pitch angle of the camera with respect to the road plane at each road space segmentation point by the road image segmentation points, respectively, each of a plurality of three-dimensional space segmentation points corresponding to these road image segmentation points is referred to as a road space segmentation point, and the pitch angle which is used to indicate the angle between the optical axis of the camera and the road space centerline of the first and second road space lane lines at the road space segmentation point on the road plane;
using the processor to calculate spatial coordinates of each road space segmentation points in a recursive manner based on internal parameters, external parameters and pitch angle of the camera; and
using the processor to construct a road model of the road based on each of the spatial coordinates and obtain a slope angle of the road at an arbitrary position or a corresponding road depth by the road model;
controlling the vehicle to provide assisted driving based on the road model.

2. The method of claim 1, wherein the step of determining the pitch angle of the camera with respect to the road plane at each road space segmentation point by the road image segmentation points, respectively further comprises:
fitting portions of the first image lane line and the second image lane line within a neighborhood interval of the road image segmentation points into a first straight line and a second straight line, respectively;

determining an intersection of the first straight line and the second straight line as an image vanishing point of the road; and calculating the pitch angle of the camera with respect to the road plane at the road space division point based on the image coordinates of the image vanishing point.

3. The method of claim 2, wherein the step of fitting portions of the first image lane line and the second image lane line within a neighborhood interval of the road image segmentation points into the first straight line and the second straight line, respectively comprises:

fitting portions of the first image lane line and the second image lane line within the neighborhood interval of the road image segmentation points into the first straight line and the second straight line, respectively by using a least square method or a random sampling consensus algorithm.

4. The method of claim 2, wherein the step of calculating the pitch angle of the camera with respect to the road plane at the road space division point based on the image coordinates of the image vanishing point comprises calculating the pitch angle using the following formula:

$$\tan\theta = \frac{v - c_y}{f_y}$$

wherein, $\theta$ is the pitch angle to be calculated, (u, v) is the image coordinate of the current image vanishing point, $f_x$, $f_y$, $c_x$, $c_y$ are the camera internal parameters.

5. The method of claim 1, wherein the step of constructing a road model of the road based on each of the spatial coordinates comprises:

an equation for representing a road spatial center line of the road is fitted using a curve fitting method as the road model based on each of spatial coordinates.

6. The method of claim 5, wherein the curve fitting method comprises polynomial curve fitting or spline curve fitting.

7. The method of claim 1, wherein the step of calculating spatial coordinates of each road space segmentation points in the recursive manner based on internal parameters, external parameters and pitch angle of the camera comprises solving spatial coordinates of each road spatial segmentation points based on the following equations:

$$\begin{bmatrix} u \\ v \\ 1 \end{bmatrix} = \frac{1}{z_c} \cdot \begin{bmatrix} f_x & 0 & c_x & 0 \\ 0 & f_y & c_y & 0 \\ 0 & 0 & 1 & 0 \end{bmatrix} \cdot \begin{bmatrix} R & T \\ 0 & 1 \end{bmatrix} \cdot \begin{bmatrix} x_w \\ y_w \\ z_w \\ 1 \end{bmatrix} \text{ and}$$

$$\left\langle \overrightarrow{P_n P_{n-1}}, \overrightarrow{K_n} \right\rangle = \frac{\theta_n - \theta_{n-1}}{2};$$

wherein n is an integer equal to or greater than 1, ($x_w$, $y_w$, $z_w$) is the space coordinate of the road space segmentation point Pn to be calculated, (u, v) is an image coordinate of a road image segmentation point corresponding to the road space segmentation point Pn, $f_x$, $f_y$, $c_x$, $c_y$ are internal parameters of the camera, R is an external parameter rotation matrix of the camera, T is an external parameter translation vector of the camera, $\theta_n$ is the pitch angle of the camera with respect to the road plane at the road space segmentation point Pn, $\theta_{n-1}$ is a pitch angle of the camera with respect to the road plane at the previous road space segmentation point Pn−1; the space coordinate of the first road space segmentation point P0 is pre-determined according to an origin of the three-dimensional space coordinate system.

8. A device for road slope predicting, comprising:
a memory stored with machine executable programs; and
a processor configured to, when executing the machine executable programs, implement the road slope predicting method of claim 1.

9. A non-transitory computer-readable storage medium having stored therein a computer program, wherein the computer program, when executed by a processor, implements the road slope prediction method of claim 1.

* * * * *